(12) United States Patent
Qiu et al.

(10) Patent No.: US 10,866,911 B2
(45) Date of Patent: Dec. 15, 2020

(54) METHOD AND APPARATUS FOR ESTABLISHING CONNECTION IN NON-VOLATILE MEMORY SYSTEM

(71) Applicant: HUAWEI TECHNOLOGIES CO., LTD., Guangdong (CN)

(72) Inventors: Xin Qiu, Shenzhen (CN); Chunyi Tan, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 66 days.

(21) Appl. No.: 16/170,489

(22) Filed: Oct. 25, 2018

(65) Prior Publication Data

US 2019/0065412 A1 Feb. 28, 2019

Related U.S. Application Data

(63) Continuation of application No. PCT/CN2017/080479, filed on Apr. 13, 2017.

(30) Foreign Application Priority Data

Apr. 27, 2016 (CN) .......................... 2016 1 0268770

(51) Int. Cl.
*G06F 13/16* (2006.01)
*G06F 3/06* (2006.01)

(52) U.S. Cl.
CPC ........ *G06F 13/1668* (2013.01); *G06F 3/0611* (2013.01); *G06F 3/0635* (2013.01); *G06F 3/0688* (2013.01)

(58) Field of Classification Search
None
See application file for complete search history.

(56) References Cited

U.S. PATENT DOCUMENTS 8,127,059 B1 * 2/2012 Carr ...................... G06F 13/387 710/74
8,259,506 B1 * 9/2012 Sommer ............. G11C 11/5642 365/185.03

(Continued)

FOREIGN PATENT DOCUMENTS

| CN | 102223388 A | 10/2011 |
|---|---|---|
| CN | 102694860 A | 9/2012 |
| CN | 105912275 A | 8/2016 |

OTHER PUBLICATIONS

NVM Express over Fabrics Revision 1.0, Jun. 5, 2016, 49 pages.

*Primary Examiner* — Henry Tsai
*Assistant Examiner* — Christopher A Bartels
(74) *Attorney, Agent, or Firm* — Womble Bond Dickinson (US) LLP

(57) ABSTRACT

A method for establishing a connection in a non-volatile memory system is provided. A connection to a host is established. A request message with a target parameter of an NVM subsystem is received. A target NVM subsystem that meets the target parameter is determined. Routing information of the target NVM subsystem is determined. A response message that includes the routing information of the target NVM subsystem is sent. According to the method for establishing a connection in a non-volatile memory system, the host can establish a connection to an NVM subsystem that meets a requirement to improve connection reliability.

10 Claims, 6 Drawing Sheets

(56) References Cited

U.S. PATENT DOCUMENTS

| | | | |
|---|---|---|---|
| 8,560,772 B1* | 10/2013 | Piszczek | G06F 11/1076 |
| | | | 711/114 |
| 8,719,520 B1* | 5/2014 | Piszczek | G06F 11/1076 |
| | | | 709/219 |
| 9,946,596 B2* | 4/2018 | Hashimoto | G06F 11/1068 |
| 2002/0133646 A1* | 9/2002 | Cheung | G06F 13/385 |
| | | | 710/22 |
| 2004/0148460 A1* | 7/2004 | Steinmetz | G06F 3/0607 |
| | | | 711/114 |
| 2006/0174048 A1* | 8/2006 | Ohara | G06F 13/28 |
| | | | 710/305 |
| 2006/0277383 A1 | 12/2006 | Hayden et al. | |
| 2007/0088537 A1* | 4/2007 | Lertora | G06F 15/7867 |
| | | | 703/28 |
| 2008/0133779 A1* | 6/2008 | Ho | G06F 13/4291 |
| | | | 710/5 |
| 2009/0103362 A1* | 4/2009 | Pekny | G06F 13/1694 |
| | | | 365/185.04 |
| 2009/0137318 A1* | 5/2009 | Russo | G06F 13/4291 |
| | | | 463/40 |
| 2011/0153910 A1* | 6/2011 | MacKenna | G06F 13/4234 |
| | | | 711/103 |
| 2012/0324147 A1* | 12/2012 | Lai | G06F 13/4291 |
| | | | 711/103 |
| 2013/0325998 A1* | 12/2013 | Hormuth | G06F 15/17331 |
| | | | 709/212 |
| 2017/0039162 A1* | 2/2017 | Mishra | G06F 13/4282 |
| 2017/0075828 A1* | 3/2017 | Monji | G06F 13/1668 |
| 2017/0206034 A1* | 7/2017 | Fetik | G06F 3/0653 |
| 2018/0191721 A1* | 7/2018 | Freyensee | H04L 9/0822 |
| 2018/0307607 A1* | 10/2018 | Sato | G06F 12/10 |

* cited by examiner the routing information to establish the connection to the target NVM subsystem.

METHOD AND APPARATUS FOR ESTABLISHING CONNECTION IN NON-VOLATILE MEMORY SYSTEM

CROSS-REFERENCE TO RELATED APPLICATIONS

This application is a continuation of International Application No. PCT/CN2017/080479, filed on Apr. 13, 2017, which claims priority to Chinese Patent Application No. 201610268770.3, filed on Apr. 27, 2016. The disclosures of the aforementioned applications are hereby incorporated by reference in their entireties.

TECHNICAL FIELD

Embodiments of the invention relate to the storage field, and in particular, to a method and an apparatus for establishing a connection in a non-volatile memory system.

BACKGROUND

A non-volatile memory express (NVMe) is a high-speed interface bus specification. The NVMe standard that has been released is mainly designed and developed based on a Peripheral Component Interconnect Express (PCIe) architecture, and unifies a queue transmission mechanism between a device and a host that are connected based on a PCIe bus. With high performance of the PCIe bus, the PCIe architecture-based NVMe has become a standard interface for a mainstream solid state drive (SSD) device in the industry.

However, because of a limited quantity of existing PCIe networks in the data center field and disadvantages such as poor scalability of a PCIe protocol, to extend the NVMe standard to the data center field, a new standard is required to run an NVMe protocol in network technologies such as an Internet wide-area remote direct memory access (RDMA) protocol (iWARP), RDMA over Converged Ethernet (RoCE), InfiniBand (IB), or a fiber channel (FC), to provide more flexible and wider application. The new standard may be referred to as NVMe over Fabric.

For an existing NVMe over Fabric standard, FIG. 1 shows a system architecture of existing NVMe over Fabric. In the system, a host may send a discovery command to a server to instruct the server to send routing information of an NVM subsystem to the host. After the server receives the discovery command, a controller in the server may read the routing information and return the routing information to the host. The host selects one or more non-volatile memory (NVM) subsystems in the system architecture of NVMe over Fabric based on the received routing information to perform connection.

In the prior art, the routing information sent by the server to the host at a current stage includes only an identifier of the host such as an identity (ID) of the host, identifier information of a plurality of NVM subsystems such as an NVMe qualified name (NQN) of an NVM subsystem, and port information of each NVM subsystem, and the host randomly selects an NVM subsystem based on the routing information to perform connection. Consequently, the host is connected to an unmatched NVM subsystem, for example, the connected NVM subsystem is faulty, or the connected NVM subsystem does not meet a requirement of the host for a storage resource. As such, the connection fails, or the host needs to repeatedly perform connection for a plurality of times, resulting in low connection efficiency.

SUMMARY

This application provides a method and an apparatus for establishing a connection in a non-volatile memory system, to improve system reliability.

According to at least one embodiment, a method for establishing a connection in a non-volatile memory system is provided, where the non-volatile memory system includes a host, a server, and at least one non-volatile memory NVM subsystem, the at least one NVM subsystem is configured to provide data storage for the host, the server stores parameter information and routing information of each of the at least one NVM subsystem, the method is performed by the server, and the method includes: establishing a connection to the host; receiving a request message sent by the host, where the request message includes a target parameter of an NVM subsystem to which the host needs to connect; determining, by searching for parameter information of the at least one NVM subsystem, a target NVM subsystem that meets the target parameter and determining routing information of the target NVM subsystem; and sending a response message to the host, where the response message includes the routing information of the target NVM subsystem, so that the host establishes a connection to the target NVM subsystem based on the routing information of the target NVM subsystem.

According to at least one embodiment of the method for establishing a connection in a non-volatile memory system, the server receives the target parameter that is sent by the host and that is of the NVM subsystem to which the host needs to connect; and determines, by searching for the parameter information of the at least one NVM subsystem, that an NVM subsystem that meets the target parameter is the target NVM subsystem, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets a requirement, and connection reliability is improved.

Optionally, the target NVM subsystem may include a plurality of NVM controllers, and the method further includes: determining a target NVM controller from the plurality of NVM controllers based on information about the plurality of NVM controllers, where the target NVM controller is configured to connect to the host.

It should be understood that each NVM subsystem may include one or more NVM controllers. If the target NVM subsystem includes only one NVM controller, after the target NVM subsystem is determined, the host may establish the connection to the target NVM subsystem. To be specific, the host establishes a connection to the unique NVM controller in the target NVM subsystem. If the target NVM subsystem includes a plurality of NVM controllers, one target NVM controller that matches the host may be further determined from the plurality of NVM controllers based on information about the plurality of NVM controllers, and the host establishes the connection to the target NVM subsystem. To be specific, the host establishes a connection to the target NVM controller in the target NVM subsystem.

It should be understood that the target NVM subsystem may include a plurality of ports. Therefore, the routing information sent by the server to the host may be used by the host to select one path based on the routing information of the target NVM subsystem and establish the connection to the target NVM subsystem by using one port.

Optionally, the routing information of the target NVM subsystem may include an identifier of the host, an identifier of the target NVM subsystem, and information about a path from the host to the target NVM subsystem.

According to at least one embodiment, before the determining a target NVM subsystem that meets the preset rule, the method further includes: obtaining current parameter information of each NVM subsystem; and updating the stored parameter information of each NVM subsystem based on the current parameter information of each NVM subsystem.

It should be understood that the parameter information of each NVM subsystem may include capacity or performance-related information of each NVM subsystem. After establishing a connection to an NVM subsystem, the host uses a storage resource in the NVM subsystem. Therefore, parameter information of the NVM subsystem changes at any time when different hosts establish connections to the NVM subsystem. The server may update the stored parameter information of each NVM subsystem at any time, to provide the host with more accurate parameter information.

For example, an update period may be set in the server. The server periodically sends an information update request to an NVM subsystem, and obtains current parameter information fed back by the NVM subsystem. The server updates stored parameter information of the corresponding NVM subsystem based on the current parameter information. Alternatively, an update period may be set in an NVM subsystem. The NVM subsystem periodically sends current parameter information, and the server updates stored parameter information of the corresponding NVM subsystem based on the obtained current parameter information of the NVM subsystem.

For another example, the request message sent by the host may be used to trigger the server to update the parameter information. The server receives the request message. The request message triggers the server to update the parameter information of the NVM subsystem. After updating the parameter information of the NVM subsystem, the server determines, for the host based on updated parameter information of the NVM subsystem, the target NVM subsystem that meets the target parameter. To update the parameter information, the server may send an information update request to each NVM subsystem, and then update the parameter information in the server based on current parameter information fed back by each NVM subsystem.

According to at least one embodiment, the parameter information of each NVM subsystem includes at least one of the following: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

Optionally, the parameter information of each NVM subsystem may include a total capacity of the NVM subsystem, and the target parameter provided by the host may include a total capacity of an NVM subsystem, so that the server can determine, based on the total capacity in the target parameter, an NVM subsystem that meets a requirement of the host for a capacity. In this case, the host can start data migration scheduling between different NVM subsystems, so that storage resources in the current target NVM subsystem are sufficient.

Optionally, the parameter information of each NVM subsystem may include an available capacity of the NVM subsystem. An NVM subsystem may be connected to one or more hosts. Because a part of a capacity of the NVM subsystem may be occupied by another host, an available capacity of the NVM subsystem is a capacity of a resource that is not occupied by any host in the NVM subsystem, that is, a remaining capacity of the NVM subsystem.

Optionally, the information about the at least one namespace includes at least one of the following: a quantity of the at least one namespace, a capacity of each of the at least one namespace, performance of each namespace, a quantity of available namespaces in the at least one namespace, a capacity of the available namespace, and performance of the available namespace.

Specifically, each NVM subsystem may include at least one namespace, the at least one namespace may have a same capacity or different capacities, and some namespaces may be occupied by another host. Therefore, from a perspective of capacity, an appropriate namespace may be selected based on the quantity of namespaces and the capacity of each namespace or based on the quantity of the unoccupied available namespaces and the capacity of the available namespace, and then a corresponding NVM subsystem is selected as the target NVM subsystem, that is, the NVM subsystem that meets the target parameter of the host.

In addition, the at least one namespace may have different attributes. For example, different namespaces may include different storage media, and therefore have different performance. Therefore, the host may further select an appropriate namespace based on performance of a namespace, and then select a corresponding NVM subsystem as the target NVM subsystem to perform connection.

Optionally, the information about the at least one NVM controller includes at least one of the following: a quantity of the at least one NVM controller, an identity ID of each of the at least one NVM controller, performance of each NVM controller, a quantity of available NVM controllers in the at least one NVM controller, an ID of the available NVM controller, and performance of the available NVM controller.

According to at least one embodiment, each NVM subsystem may include at least one NVM controller, and each NVM controller can be connected to only one host. Therefore, for at least one NVM controller included in any NVM subsystem, an appropriate NVM controller may be selected based on a quantity and an identifier of the at least one NVM controller or based on a quantity and identifiers of available NVM controllers, to connect to the host. In other words, the target NVM subsystem to which the NVM controller belongs is selected to connect to the host. This can avoid a process in which the host selects the NVM controller through negotiation after being connected to the target NVM subsystem, prevent the host from establishing a connection to an inappropriate or unavailable NVM controller, and improve reliability of a connection between the host and the NVM controller.

In addition, an appropriate NVM controller may be selected based on performance of an NVM controller, for example, a physical resource or a virtual resource occupied by the NVM controller and a size of the occupied resource, and based on a requirement of the host for performance of an NVM controller in the target parameter, to perform the connection. This further improves reliability of a connection between the host and the NVM controller.

Optionally, the parameter information of the NVM subsystem may further include the mapping relationship between the NVM controller and the namespace. Because each NVM controller may correspondingly manage one or more namespaces, an appropriate NVM controller may be further determined based on the mapping relationship between the NVM controller and the namespace and based on a requirement of the host for a namespace in the target parameter, and the appropriate NVM controller is used as the target NVM controller to perform connection.

According to at least one embodiment, a method for establishing a connection in a non-volatile memory system is provided, where the non-volatile memory system includes a host, a server, and at least one non-volatile memory NVM subsystem, the at least one NVM subsystem is configured to provide data storage for the host, the server stores parameter information and routing information of each of the at least one NVM subsystem, the method is performed by the host, and the method includes: establishing a connection to the server; sending a request message to the server; receiving a response message sent by the server based on the request message, where the response message includes parameter information and routing information of some or all of the at least one NVM subsystem; determining, based on the parameter information of some or all of the NVM subsystem, a target NVM subsystem that meets a target parameter and determining routing information of the target NVM subsystem, where the target parameter is a parameter of an NVM subsystem to which the host needs to connect; and establishing a connection to the target NVM subsystem based on the routing information of the target NVM subsystem.

According to at least one embodiment of the method for establishing a connection in a non-volatile memory system, the host establishes the connection to the server, obtains the parameter information that is of some or all of the NVM subsystem and that is stored in the server, and selects, as the target NVM subsystem based on the parameter information of some or all of the NVM subsystem, an NVM subsystem that meets a requirement of the host, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

Optionally, the target NVM subsystem may include a plurality of NVM controllers, and the method further includes: determining a target NVM controller from the plurality of NVM controllers based on information about the plurality of NVM controllers, where the target NVM controller is configured to connect to the host.

It should be understood that each NVM subsystem may include one or more NVM controllers. If the target NVM subsystem includes only one NVM controller, after the target NVM subsystem is determined, the host may establish the connection to the target NVM subsystem. To be specific, the host establishes a connection to the unique NVM controller in the target NVM subsystem. If the target NVM subsystem includes a plurality of NVM controllers, one target NVM controller that matches the host may be further determined from the plurality of NVM controllers based on information about the plurality of NVM controllers, and the host establishes the connection to the target NVM subsystem. To be specific, the host establishes a connection to the target NVM controller in the target NVM subsystem.

It should be understood that the target NVM subsystem may include a plurality of ports. Therefore, that the host determines routing information of the target NVM subsystem may include: establishing connections to the target NVM subsystem by using different ports in a plurality of paths, so that the host can select one path based on the routing information and establish the connection to the target NVM subsystem by using one port.

Optionally, the routing information of the target NVM subsystem may include an identifier of the host, an identifier of the target NVM subsystem, and information about a path from the host to the target NVM subsystem.

According to at least one embodiment, the parameter information of each NVM subsystem includes at least one of the following: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

It should be noted that the parameter information of each NVM subsystem is the same as the parameter information of each NVM subsystem in the first aspect. In addition, a process of determining the target NVM subsystem by the host based on the parameter information of each NVM subsystem is similar to a process of determining the target NVM subsystem by the server based on the parameter information of each NVM subsystem. Details are not described herein again.

According to at least one embodiment, the server is configured to update the parameter information of each NVM subsystem based on current parameter information of each NVM subsystem.

It should be understood that the parameter information of each NVM subsystem may include capacity or performance-related information of each NVM subsystem. After establishing a connection to an NVM subsystem, the host uses a storage resource in the NVM subsystem. Therefore, parameter information of the NVM subsystem changes at any time when different hosts establish connections to the NVM subsystem. The server may update the stored parameter information of each NVM subsystem at any time, to provide the host with more accurate parameter information.

For example, an update period may be set in the server. The server periodically sends an information update request to an NVM subsystem, and obtains current parameter information fed back by the NVM subsystem. The server updates stored parameter information of the corresponding NVM subsystem based on the current parameter information. Alternatively, an update period may be set in an NVM subsystem. The NVM subsystem periodically sends current parameter information, and the server updates stored parameter information of the corresponding NVM subsystem based on the obtained current parameter information of the NVM subsystem.

For another example, the request message sent by the host may be used to trigger the server to update the parameter information of the NVM subsystem. The server is first triggered, based on the received request message sent by the host, to update the parameter information of the NVM subsystem, and then the server obtains updated parameter information of the NVM subsystem, and sends the updated parameter information of the NVM subsystem to the host.

Optionally, to update the routing information, the server may send an information update request to each NVM host, and then update the parameter information in the server based on response information fed back by each NVM host.

According to at least one embodiment, a server in a non-volatile memory system is provided, where the server is configured to perform the methods to establish a connection in a non-volatile memory system to establish a connection in a non-volatile memory system as described herein. According to at least one embodiment, the apparatus includes units configured to perform the methods to establish a connection in a non-volatile memory system as described herein.

According to at least one embodiment, a host in a non-volatile memory system is provided, where the host is configured to perform the methods to establish a connection in a non-volatile memory system as described herein. Specifically, the apparatus includes units configured to perform the methods to establish a connection in a non-volatile memory system as described herein.

According to at least one embodiment, a server in a non-volatile memory system is provided, including: a storage unit and a processor, where the storage unit is configured to store an instruction, the processor is configured to execute the instruction stored in the memory, and when the processor executes the instruction stored in the memory, the execution enables the processor to perform the methods to establish a connection in a non-volatile memory system as described herein.

According to at least one embodiment, a host in a non-volatile memory system is provided, including: a storage unit and a processor, where the storage unit is configured to store an instruction, the processor is configured to execute the instruction stored in the memory, and when the processor executes the instruction stored in the memory, the execution enables the processor to perform the methods to establish a connection in a non-volatile memory system as described herein.

According to at least one embodiment, a computer readable medium is provided, where the computer readable medium is configured to store a computer program, and the computer program includes an instruction used to perform the methods to establish a connection in a non-volatile memory system as described herein.

According to at least one embodiment, a computer readable medium is provided, where the computer readable medium is configured to store a computer program, and the computer program includes an instruction used to perform the methods to establish a connection in a non-volatile memory system as described herein.

BRIEF DESCRIPTION OF DRAWINGS

To describe the technical solutions in the embodiments of the invention more clearly, the following briefly describes the accompanying drawings required for describing the embodiments of the invention. Apparently, the accompanying drawings in the following description show merely some embodiments of the invention, and a person of ordinary skill in the art may derive other drawings from these accompanying drawings.

DESCRIPTION OF EMBODIMENTS

The following clearly describes the technical solutions in the embodiments of the invention with reference to the accompanying drawings in the embodiments of the invention.

Figure 1:
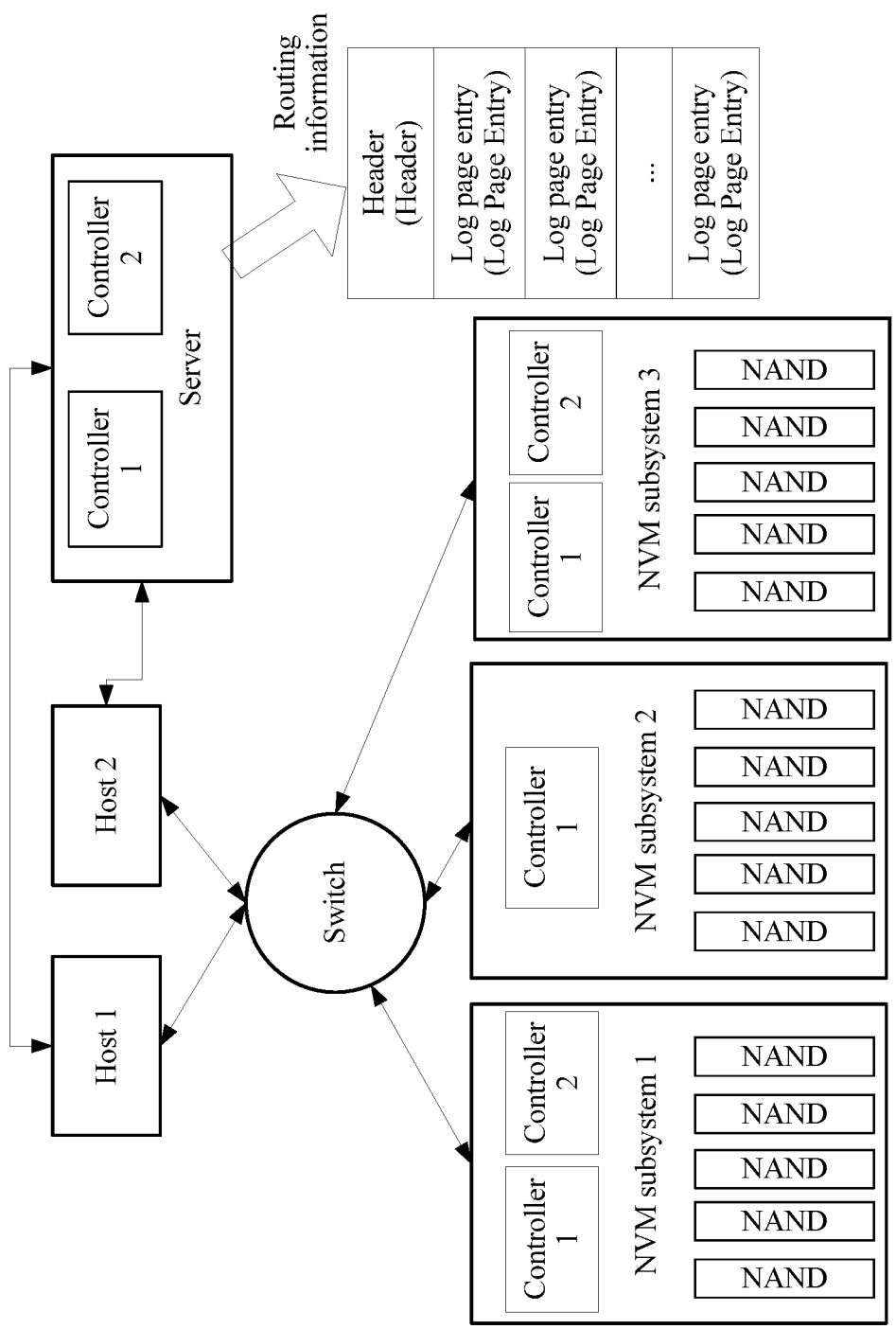
FIG. 1 is a schematic diagram of a system architecture of NVMe over Fabric according to an embodiment of the invention.

FIG. 1 shows a system architecture of NVMe over Fabric. The system architecture mainly includes one or more hosts, a server, and at least one NVM subsystem. The at least one NVM subsystem is configured to provide data storage for the host. The host may be a physical machine or may be a virtual machine. The server may be a physical machine or may be a virtual machine. In the prior art, the server stores routing information of at least one NVM subsystem. The server includes one or more controllers. The controller is only configured to read the routing information stored in the server. The routing information includes a plurality of log page entries. Each log page entry may include information about a route from the host to an NVM subsystem. The NVM subsystem includes at least one NVM controller and at least one NAND flash. The NAND flash is a voltage component and is configured to store data. For example, each NVM subsystem in FIG. 1 includes five NAND flashes, or each NVM subsystem may include different quantities of NAND flashes. The NAND flash may be indicated by using a logical block set, that is, a namespace. A mapping relationship between the NAND flash and the namespace is not fixed. To be specific, one NAND flash may be corresponding to a plurality of namespaces, or one namespace is corresponding to a plurality of NAND flashes. A capacity of the namespace may be set based on actual application.

In the prior art, when any one host needs to connect to an NVM subsystem, the host may first establish a connection to a server, and then send a discovery command to the server. The server reads a stored log page based on the discovery command by using a controller in the server. The log page may include a plurality of log page entries. Each log page entry is corresponding to a connection path of one NVM subsystem. For example, if one NVM subsystem may be accessed by using a plurality of paths, each path is corresponding to one log page entry.

In the prior art, each log page entry includes only a host ID, a host NQN, an NVM subsystem NQN, and information about a path connected to an NVM subsystem. The information about the path connected to the NVM subsystem includes only an address type (Address Family), a transport address (Transport Address), a port identifier, and a controller identifier. The address family indicates an address type, for example, may be IPv4 or IPv6. The transport address indicates specific address information, for example, an IP address. The port ID is used to indicate different ports of the NVM subsystem. Because each NVM subsystem may include one or more ports, the host may establish a connection to the NVM subsystem based on information provided in the log page entry. The controller ID indicates a controller (NVM Controller) in the NVM subsystem. Each NVM subsystem may include at least one NVM controller. For selection of the controller, the host may specify a fixed controller in the NVM subsystem to connect to the NVM subsystem, or may specify any controller in the NVM subsystem to connect to the NVM subsystem.

Because the routing information in the prior art includes only the foregoing information about an identifier type, the host can be connected to only one NVM subsystem. However, the NVM subsystem may fail to meet a requirement of the host for storage, performance, or the like. For example, if a host needs to connect to an NVM subsystem that includes 100 GB storage resources, but currently only one of a plurality of NVM subsystems can provide the storage resources, in the prior art, the host tries to connect to the NVM subsystems one by one, until the host is connected to the NVM subsystem that can meet a storage capacity requirement. An operation procedure is complex and connection efficiency is low. For another example, when there is one path, one NVM subsystem is corresponding to only one log page entry. Because only one controller ID is returned in the log page entry for the host to perform connection, if the controller becomes faulty in a subsequent connection process, the host may fail to connect to a corresponding NVM subsystem, and a storage resource is wasted. Therefore, an embodiment of the invention provides a method for establishing a connection in the system architecture, to improve efficiency and reliability of establishing a connection between the host and a corresponding NVM subsystem.

Figure 2:
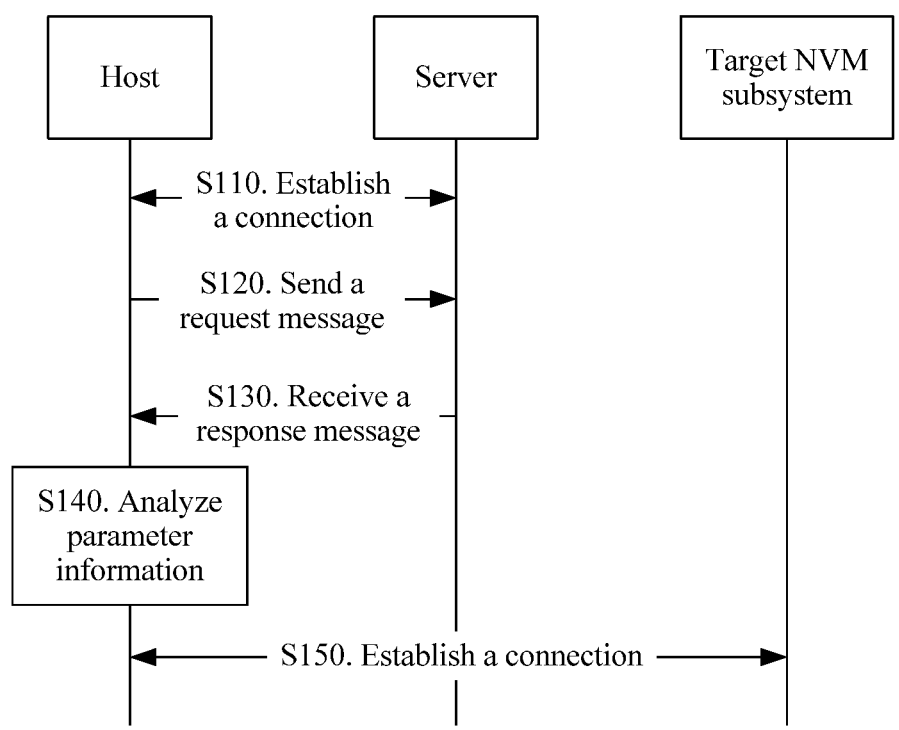
FIG. 2 is a schematic flowchart of a method for establishing a connection in a non-volatile memory system according to an embodiment of the invention.

As shown in FIG. 2, FIG. 2 shows a schematic flowchart of a method 100 for establishing a connection in a non-volatile memory system according to an embodiment of the invention. The method 100 may be applied to the non-volatile memory system shown in FIG. 1. To be specific, the non-volatile memory system includes a host, a server, and at least one NVM subsystem. As shown in FIG. 2, the method 100 includes the following operations.

S110. The host establishes a connection to the server.

It should be understood that when the host is started, or whenever the host needs to establish a connection to the at least one NVM subsystem, or when the host needs routing information of an NVM subsystem, the host first establishes the connection to the server. For example, the host may implement, by using a connect command in an NVMe over Fabric standard, a process of establishing the connection, but the embodiment of the invention is not limited thereto.

S120. The host sends a request message to the server, where the request message is used to request the server to send parameter information and routing information of an NVM subsystem, so that the host can determine, based on the parameter information of the NVM subsystem, a target NVM subsystem that meets a preset condition.

Specifically, when the host needs to connect to an NVM subsystem, the host may send a request message to the server, and request, by using the request message, the server to send parameter information and routing information of the NVM subsystem. Because a system architecture of NVMe over Fabric may include at least one NVM subsystem, the host may request the server to send parameter information and routing information of some or all of the at least one NVM subsystem.

S130. The host receives a response message sent by the server based on the request message, where the response message includes parameter information and routing information of some or all of the at least one NVM subsystem.

It should be understood that the parameter information of the NVM subsystem may be stored in the server, that is, the server shown in FIG. 1. In the prior art, the server stores routing information of each NVM subsystem. However, in the embodiment of the invention, the server further stores parameter information of each NVM subsystem. The server reads the parameter information and the routing information of all or some of the NVM subsystem based on the request message, and indicates the parameter information and the routing information of each NVM subsystem by using a log page entry. The server sends the response message to the host. The response message includes one or more log page entries that indicate the parameter information and the routing information of the NVM subsystem.

It should be understood that, same as that in the prior art, the routing information of each NVM subsystem may include an identifier of the host, an identifier of the NVM subsystem, and information indicating a path from the host to the NVM subsystem.

S140. The host analyzes the received parameter information of the NVM subsystem, and determines, based on the parameter information of the NVM subsystem, the target NVM subsystem that meets a target parameter, where the target NVM subsystem may meet a requirement of the host for a storage capacity, performance, or the like. Optionally, the host may further determine routing information of the target NVM subsystem, so that the host establishes a connection to the target NVM subsystem based on the routing information.

It should be understood that the target parameter is the preset condition set by the host, and the target parameter may be used to indicate the requirement for the storage capacity, performance, or the like that needs to be met by an NVM subsystem to which the host needs to connect. For example, if the host needs to establish a connection to an NVM subsystem whose total storage capacity is greater than 100 GB, the target parameter may be that a total storage capacity of an NVM subsystem is greater than 100 GB.

It should be understood that after determining the target NVM subsystem, the host may establish the connection to the target NVM subsystem. To be specific, the host establishes a connection to an NVM controller in the target NVM subsystem, and uses a storage resource by using the NVM controller. Therefore, that the host determines the target NVM subsystem includes: The host determines a target NVM controller in the target NVM subsystem, and the host establishes a connection to the target NVM controller.

Optionally, the parameter information that is of each NVM subsystem and that is stored in the server or parameter information of each of the one or more NVM subsystems that is received by the host may include at least one piece of the following information: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

For the total capacity of each NVM subsystem, the host obtains the total capacity of the NVM subsystem and selects, as the matched target NVM subsystem, an NVM subsystem whose total capacity meets the target parameter requested by the host. In this way, when storage resources are insufficient, the host may start data migration scheduling between different NVM subsystems, so that storage resources in the current target NVM subsystem are sufficient.

For the available capacity of each NVM subsystem, the available capacity may also be referred to as a remaining capacity of the NVM subsystem. Each NVM subsystem may include a plurality of NVM controllers, and each NVM controller may be connected to one host. Therefore, for any NVM subsystem, a part of a capacity of the NVM subsystem may be occupied by another connected host. In this case, the parameter information that is of the NVM subsystem and that is sent by the server may include remaining capacity of the NVM subsystem, and the remaining capacity is available capacity of the NVM subsystem. The host may determine, based on the available capacity of the NVM subsystem, whether the NVM subsystem meets the requirement of the host in the target parameter, and determine that an NVM subsystem that meets a capacity requirement of the host is the target NVM subsystem.

For example, if the host wants to connect to an NVM subsystem that has 10 GB storage resources, that is, the target parameter is that a size of storage resources is greater than or equal to 10 GB, the host may first select, based on an available capacity of an NVM subsystem to perform connection, an NVM subsystem that meets a requirement. If currently there is an NVM subsystem whose available capacity is greater than or equal to 10 GB, the host determines that the NVM subsystem is the target NVM subsystem, and connects to the target NVM subsystem. If currently there is no NVM subsystem whose available capacity is greater than or equal to 10 GB, the host may select, based on a total capacity of an NVM subsystem, an NVM subsystem whose total capacity is greater than or equal to 10 GB, determine that the NVM subsystem is the target NVM subsystem, and connect to the target NVM subsystem. After the connection is established, data migration may be performed between NVM subsystems, so that an available capacity of the target NVM subsystem meets the requirement of the host.

Optionally, for the information about the at least one namespace in the parameter information of each NVM subsystem, the information about the at least one namespace includes at least one of the following: a quantity of the at least one namespace, a capacity of each namespace, performance of each namespace, data of available namespaces in the at least one namespace, a capacity of each available namespace, and performance of each available namespace.

Specifically, each NVM subsystem may include at least one namespace, the at least one namespace may have a same capacity or different capacities, and some namespaces may be occupied by another host. Therefore, from a perspective of capacity, the host may select an appropriate namespace based on the quantity of namespaces and the capacity of each namespace or based on the data of the unoccupied available namespaces and the capacity of the available namespace, and then select a corresponding NVM subsystem as the matched target NVM subsystem to perform connection.

In addition, the at least one namespace may have different attributes. For example, different namespaces may include different storage media, and therefore have different performance. Therefore, the target parameter may further include a requirement of the host for namespace performance, and the host may further select, based on performance of a namespace, a namespace that meets the target parameter, and then select a corresponding NVM subsystem as the target NVM subsystem to perform connection.

Optionally, for the information about the at least one NVM controller in the parameter information of each NVM subsystem, the information about the at least one NVM controller includes at least one of the following: a quantity of the at least one NVM controller, an identifier of each NVM controller, performance of each NVM controller, a quantity of available NVM controllers in the at least one NVM controller, an identifier of each available NVM controller, and performance of each available NVM controller.

Specifically, each NVM subsystem may include at least one NVM controller, and each NVM controller can be connected to only one host. Therefore, for at least one NVM controller included in any NVM subsystem, the host may select, based on a quantity and an identifier of the at least one NVM controller or based on a quantity and identifiers of available NVM controllers to perform connection, an NVM controller that meets the target parameter. In other words, the host is connected to the target NVM subsystem to which the NVM controller belongs. This can avoid a process in which the host selects the NVM controller through negotiation after selecting the target NVM subsystem to perform the connection, prevent the host from establishing a connection to an inappropriate or unavailable NVM controller, and improve reliability of a connection between the host and the NVM controller.

In addition, the host may select, based on performance of an NVM controller, for example, a physical resource or a virtual resource occupied by the NVM controller and a size of the occupied resource, and based on a requirement of the host for an NVM controller in the target parameter, an appropriate NVM controller to perform connection. This further improves reliability of a connection between the host and the NVM controller.

Optionally, the parameter information of the NVM subsystem may further include the mapping relationship between the NVM controller and the namespace. Because each NVM controller may correspondingly manage one or more namespaces, the host may determine an appropriate NVM controller based on the mapping relationship between the NVM controller and the namespace and based on a requirement of the host for a namespace in the target parameter, and use the appropriate NVM controller as the target NVM controller to perform connection.

In the embodiment of the invention, the host determines the target NVM subsystem, and may correspondingly determine the routing information of the target NVM subsystem, that is, a log page entry. Each path of each NVM subsystem may be corresponding to one log page entry. Therefore, the server may add the parameter information of the NVM subsystem to each log page entry. However, each NVM subsystem may have a plurality of paths, and if the log page entry corresponding to each path carries the parameter information of the same NVM subsystem, repeated transmission of the information is caused. Therefore, for a plurality of log page entries corresponding to different paths of a same NVM subsystem, parameter information of the NVM subsystem may be carried in only one of the log page entries, to avoid repeated transmission of the information.

It should be understood that because the parameter information that is of the NVM subsystem and that is sent by the server includes capacity or performance-related information of each NVM subsystem, and the information changes at any time when different hosts establish connections to different NVM subsystems, the server may update the stored parameter information of the NVM subsystem at any time.

For example, an update period may be set in the server. The server periodically sends an information update request to an NVM subsystem, and obtains current parameter information fed back by the NVM subsystem. The server updates stored parameter information of the corresponding NVM subsystem based on the current parameter information. Alternatively, an update period may be set in an NVM subsystem. The NVM subsystem periodically sends current parameter information, and the server updates stored parameter information of the corresponding NVM subsystem based on the obtained current parameter information of the NVM subsystem.

For another example, the request message sent by the host may be used to trigger the server to update the parameter information. The server is first triggered, based on the received request message sent by the host, to update the parameter information, and then the server reads and obtains updated parameter information, and sends the updated parameter information to the host. The embodiment of the invention is not limited thereto.

Optionally, to update the parameter information, the server may send an information update request to each NVM subsystem, and then update the parameter information in the server based on response information fed back by each NVM subsystem.

S150. The host establishes a connection to the target NVM subsystem based on routing information of the target NVM subsystem.

Specifically, after determining the target NVM subsystem that meets the target parameter, the host may establish the connection to the NVM subsystem. Optionally, because the target NVM subsystem may include a plurality of NVM controllers, the host may determine, based on the prior art through negotiation with the target NVM subsystem, the target NVM controller to perform connection. Alternatively, when determining the target NVM subsystem, the host determines the target NVM controller based on information about the NVM controller in the parameter information of the NVM subsystem and based on the requirement of the host for the NVM controller, for example, performance or an accessible namespace, and directly establishes the connection to the target NVM controller. The embodiment of the invention is not limited thereto.

Optionally, as shown in FIG. 1, in the system architecture of NVMe over Fabric, the host may establish the connection to the target NVM subsystem by using a switch.

Optionally, the routing information of the target NVM subsystem may include information about a plurality of ports. In other words, the target NVM subsystem is corresponding to a plurality of log page entries. In this case, the host may select one path and establish the connection to the target NVM subsystem by using one port.

Therefore, according to the method for establishing a connection in a non-volatile memory system in the embodiment of the invention, the host receives the parameter information that is of the NVM subsystem and that is sent by the server, and select, as the target NVM subsystem based on information about related performance of all parts included in each NVM subsystem in the parameter information of the NVM subsystem, an NVM subsystem that matches the host, and the host establishes the connection to the target NVM subsystem. This can avoid a connection to an incorrect or inappropriate NVM subsystem, and avoid repeated connection caused by blind selection and connection. In this way, the host can establish the connection to the NVM subsystem that meets a requirement of the host, and connection reliability is improved.

A method for determining, by the host, the target NVM subsystem and then establishing a connection between the host and the target NVM subsystem in an embodiment is described above in detail with reference to FIG. 1 and FIG. 2. A method for determining, by a server, a target NVM subsystem and then establishing a connection between a host and the target subsystem in another embodiment is described below with reference to FIG. 3.

Figure 3:
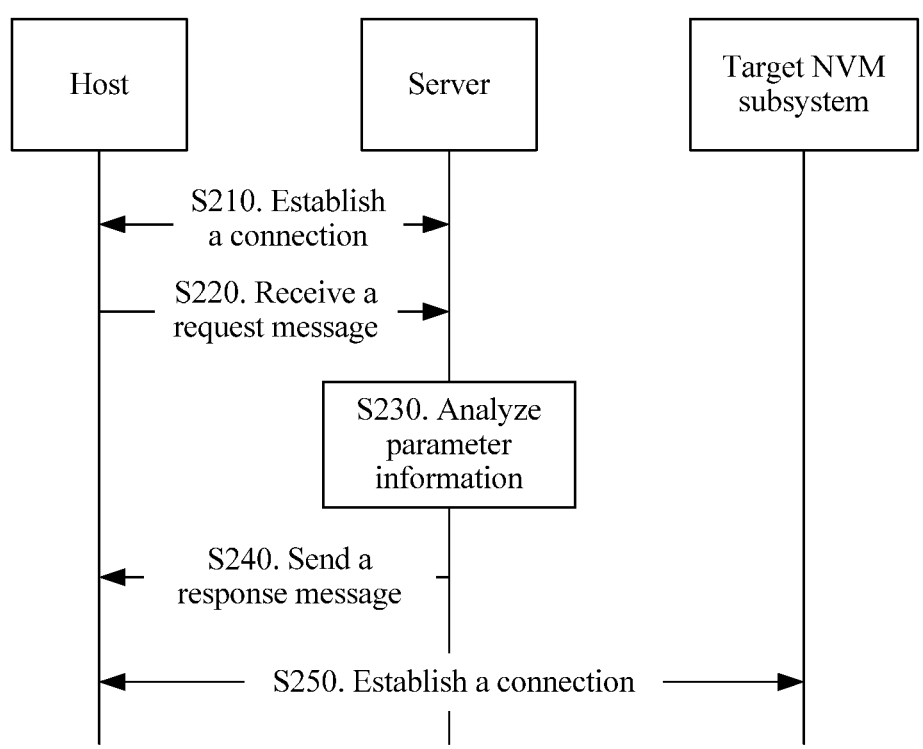
FIG. 3 is a schematic flowchart of a method for establishing a connection in a non-volatile memory system according to another embodiment of the invention.

FIG. 3 shows a schematic flowchart of a method 200 for establishing a connection in a non-volatile memory system according to another embodiment of the invention. The method 200 is also applied to the non-volatile memory system. The non-volatile memory system may be shown in FIG. 1, and the non-volatile memory system is the system architecture of NVMe over Fabric in the prior art.

In the method 100, the host receives the parameter information that is of the NVM subsystem and that is sent by the server, determines the matched target NVM subsystem through analysis, and performs connection. Similar to a server in the prior art, the server provides only a read function. Optionally, in the method 200, the server not only provides a read function, but also can analyze a parameter of an NVM subsystem based on a performance requirement of a host, and determine a target NVM subsystem that matches the host. Specifically, as shown in FIG. 3, the method 200 includes the following operations.

S210. The server establishes a connection to the host.

Similar to S110 in the method 100, when the host is started, or whenever the host needs to establish a connection to at least one NVM subsystem, or when the host needs routing information of an NVM subsystem, the host first establishes a connection to the server. For example, the host may implement, by using a connect command in an NVMe over Fabric standard, a process of establishing the connection, but the embodiment of the invention is not limited thereto.

S220. The server receives a request message sent by the host, where the request message is used to request the server to determine a target NVM subsystem for the host.

Specifically, the host sends the request message to the server, and the request message is used to request the server to determine, for the host, the target NVM subsystem that meets a target parameter. The target parameter is a preset condition set by the host, and the target parameter may be used to indicate a requirement for a storage capacity, performance, or the like that needs to be met by an NVM subsystem to which the host needs to connect. Therefore, the request message may include the target parameter. To be specific, the request message includes a requirement of the host for the target NVM subsystem. For example, the target parameter may be a requirement of the host for a size of storage resources: The host requires that a size of storage resources in the NVM subsystem is greater than or equal to 10 GB. For another example, the target parameter may be a requirement of the host for performance or a capacity of a namespace in the NVM subsystem.

S230. The server searches for parameter information of at least one NVM subsystem based on the request message, analyzes the parameter information of the at least one NVM subsystem, and determines the target NVM subsystem that meets a target parameter. Correspondingly, the server may further determine routing information of the target NVM subsystem.

Specifically, after receiving the request message sent by the host, the server obtains the parameter information and routing information of the at least one NVM subsystem. The routing information may be similar to that in the prior art, and includes an identifier of the host, an identifier of each NVM subsystem, and information about a path from the host to each NVM subsystem. The parameter information of the NVM subsystem may include at least one piece of the following information: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

Specifically, information included in the parameter information of the NVM subsystem is consistent with the parameter information that is of the NVM subsystem and that is sent by the server to the host in S130 and S140 in the method 100. In addition, the server may analyze parameter information of each NVM subsystem based on the requirement of the host for the NVM subsystem in the target parameter according to a process of analyzing the parameter information of the NVM subsystem by the host in S140 in the method 100, to determine the target NVM subsystem that matches the host. Details are not described herein again.

Optionally, the server may read parameter information of NVM subsystems one by one. When determining an NVM subsystem that meets the target parameter, the server stops analyzing, and determines that the NVM subsystem is the target NVM subsystem. Alternatively, the server may search for stored parameter information of each NVM subsystem, and determine the target NVM subsystem that meets the target parameter. The embodiment of the invention is not limited thereto.

Optionally, similar to the process of analyzing the parameter information of the NVM subsystem by the host in the method 100, the server can determine the target NVM subsystem. Further, because the target NVM subsystem may include a plurality of NVM controllers, the server can further determine, based on the requirement of the host in the target parameter, a target NVM controller in the target NVM subsystem that matches the host.

S240. The server sends a response message to the host, where the response message includes routing information of the target NVM subsystem, so that the host establishes a connection to the target NVM subsystem.

Specifically, the server determines the target NVM subsystem based on the requirement of the host in the target parameter and based on the parameter information of the NVM subsystem, and may send the routing information of the target NVM subsystem to the host by using the response message, so that the host establishes the connection to the target NVM subsystem.

Optionally, a log page entry may be used to indicate the routing information of the target NVM subsystem. The routing information of the NVM subsystem may include at least one of the following: an ID of the target NVM subsystem, an NQN of the target NVM subsystem, and information about a path from the host to the target NVM subsystem. Optionally, the log page entry may further include port information of the target NVM subsystem. Because the target NVM subsystem may include one or more ports, one or more log page entries may be used to indicate different ports, each log page entry is corresponding to one port of the NVM subsystem, and the host selects one port to establish the connection to the target NVM subsystem.

S250. The host establishes the connection to the target NVM subsystem.

Specifically, S250 is similar to S150 in the method 100. The host establishes the connection to the target NVM subsystem based on the received routing information of the target NVM subsystem. Alternatively, the host directly establishes a connection to the target NVM controller based on the received target NVM controller information in the target NVM subsystem. Details are not described herein.

It should be understood that, similar to the method 100, the parameter information that is of the NVM subsystem and that is stored in the server may be updated at any time. For example, an update period may be set in the server, and the server periodically updates the stored parameter information, so that the parameter information of the NVM subsystem that is obtained by the host is more accurate. For another example, the request message sent by the host may be used to trigger the server to update the parameter information. The server is first triggered, based on the received request message sent by the host, to update the parameter information, and then the server reads and obtains updated parameter information, and determines the target NVM subsystem for the host based on the updated parameter information. The embodiment of the invention is not limited thereto.

Optionally, to update the parameter information, the server may send an information update request to each NVM subsystem, and then update the parameter information in the server based on response information fed back by each NVM subsystem.

It should be understood that sequence numbers of the foregoing processes do not mean execution sequences in various embodiments of the invention. The execution sequences of the processes should be determined based on functions and internal logic of the processes, and should not be construed as any limitation on the implementation processes of the embodiments of the invention.

Therefore, according to the method for establishing a connection in a non-volatile memory system in the embodiment of the invention, the host sends the request message to the server, the server obtains the parameter information of the NVM subsystem based on the request message, selects, as the target NVM subsystem based on information about related performance of all parts included in each NVM subsystem in the parameter information of the NVM subsystem, an NVM subsystem that matches the host, and sends the routing information of the target NVM subsystem to the host by using the response message, so that the host establishes the connection to the target NVM subsystem. This can prevent the host from connecting to an incorrect or inappropriate NVM subsystem, and prevent the host from blindly and repeatedly performing a connection test. In this way, the host can establish the connection to the NVM subsystem that meets a requirement, and connection reliability is improved.

The methods for establishing a connection in a non-volatile memory system according to the embodiments of the invention are described above in detail with reference to FIG. 1 to FIG. 3. Apparatuses for establishing a connection in a non-volatile memory system according to the embodiments of the invention are described below with reference to FIG. 4 to FIG. 7.

Figure 4:
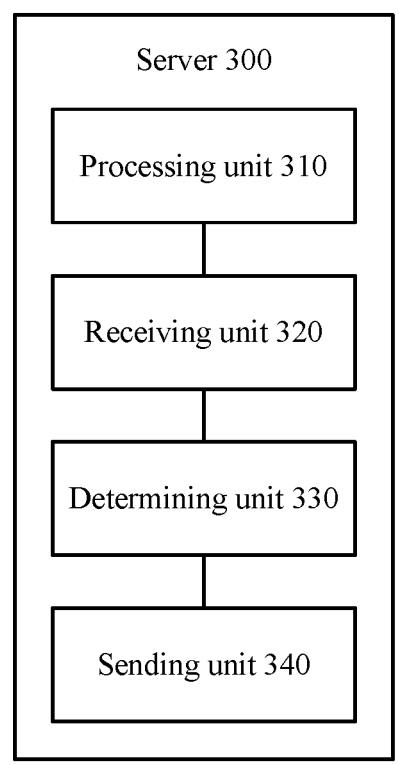
FIG. 4 is a schematic block diagram of a server in a non-volatile memory system according to an embodiment of the invention.

FIG. 4 shows a schematic block diagram of a server 300 in a non-volatile memory system according to an embodiment of the invention. The non-volatile memory system includes a host, the server 300, and at least one non-volatile memory NVM subsystem, the at least one NVM subsystem is configured to provide data storage for the host, and the server 300 stores parameter information and routing information of each of the at least one NVM subsystem. As shown in FIG. 4, the server 300 includes:

a processing unit 310, configured to establish a connection to the host;

a receiving unit 320, configured to receive a request message sent by the host, where the request message includes a target parameter of an NVM subsystem to which the host needs to connect;

a determining unit 330, configured to determine, by searching for parameter information of the at least one NVM subsystem, a target NVM subsystem that meets the target parameter and determine routing information of the target NVM subsystem; and a sending unit 340, configured to send a response message to the host, where the response message includes the routing information of the target NVM subsystem, so that the host establishes a connection to the target NVM subsystem based on the routing information of the target NVM subsystem.

Therefore, the server in the non-volatile memory system according to the embodiment of the invention receives the target parameter that is sent by the host and that is of the NVM subsystem to which the host needs to connect; and determines, by searching for the parameter information of the at least one NVM subsystem, that an NVM subsystem that meets the target parameter is the target NVM subsystem, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets a requirement, and connection reliability is improved.

Optionally, the determining unit 330 is specifically configured to: obtain current parameter information of each NVM subsystem before determining the target NVM subsystem that meets the target parameter; and update the stored parameter information of each NVM subsystem based on the current parameter information of each NVM subsystem.

Optionally, the parameter information of each NVM subsystem includes at least one of the following: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

It should be understood that the server 300 in the non-volatile memory system according to the embodiment of the invention may be corresponding to the server performing the method 200 according to the embodiments of the invention, and the foregoing and other operations and/or functions of modules in the server 300 are respectively used to implement corresponding procedures of the server in the method shown in FIG. 3. For brevity, details are not described herein.

Therefore, the server in the non-volatile memory system according to the embodiment of the invention receives the target parameter that is sent by the host and that is of the NVM subsystem to which the host needs to connect; and determines, by searching for the parameter information of the at least one NVM subsystem, that the NVM subsystem that meets the target parameter is the target NVM subsystem, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

Figure 5:
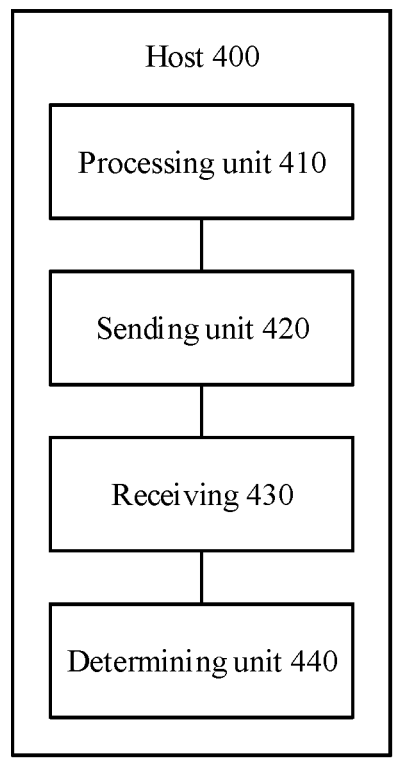
FIG. 5 is a schematic block diagram of a host in a non-volatile memory system according to an embodiment of the invention.

FIG. 5 shows a schematic block diagram of a host 400 in a non-volatile memory system according to an embodiment of the invention. The non-volatile memory system includes the host 400, a server, and at least one non-volatile memory NVM subsystem, the at least one NVM subsystem is configured to provide data storage for the host 400, and the server stores parameter information and routing information of each of the at least one NVM subsystem. As shown in FIG. 5, the host 400 includes:

a processing unit 410, configured to establish a connection to the server;

a sending unit 420, configured to send a request message to the server;

a receiving unit 430, configured to receive a response message sent by the server based on the request information, where the response message includes parameter information and routing information of some or all of the at least one NVM subsystem; and a determining unit 440, configured to determine, based on the parameter information of some or all of the NVM subsystem, a target NVM subsystem that meets a target parameter and determine routing information of the target NVM subsystem, where the target parameter is a parameter of an NVM subsystem to which the host needs to connect.

The processing unit 410 is further configured to establish a connection to the target NVM subsystem based on the routing information of the target NVM subsystem.

Therefore, the host in the non-volatile memory system according to the embodiment of the invention establishes the connection to the server, obtains the parameter information that is of some or all of the NVM subsystem and that is stored in the server, and selects, as the target NVM subsystem based on the parameter information of some or all of the NVM subsystem, an NVM subsystem that meets a requirement of the host, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

Optionally, the parameter information of each NVM subsystem includes at least one of the following: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

It should be understood that the host 400 in the non-volatile memory system according to the embodiment of the invention may be corresponding to the host performing the method 100 according to the embodiments of the invention, and the foregoing and other operations and/or functions of modules in the host 400 are respectively used to implement corresponding procedures of the host in the method shown in FIG. 2. For brevity, details are not described herein.

Therefore, the host in the non-volatile memory system according to the embodiment of the invention establishes the connection to the server, obtains the parameter information that is of some or all of the NVM subsystem and that is stored in the server, and selects, as the target NVM subsystem based on the parameter information of some or all of the NVM subsystem, the NVM subsystem that meets the requirement of the host, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

Figure 6:
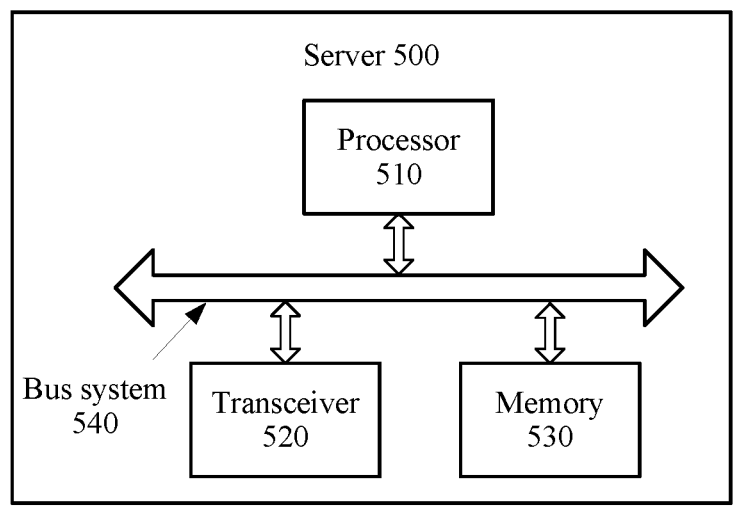
FIG. 6 is a schematic block diagram of a server in a non-volatile memory system according to another embodiment of the invention.

FIG. 6 shows a schematic block diagram of a server 500 in a non-volatile memory system according to an embodiment of the invention. The non-volatile memory system includes a host, the server 500, and at least one non-volatile memory NVM subsystem, the at least one NVM subsystem is configured to provide data storage for the host, and the server 500 stores parameter information and routing information of each of the at least one NVM subsystem. As shown in FIG. 6, the server 500 includes a processor 510 and a transceiver 520. The processor 510 is connected to the transceiver 520. Optionally, the apparatus 500 further includes a memory 530. The memory 530 is connected to the processor 510. Further, optionally, the apparatus 500 includes a bus system 540. The processor 510, the memory 530, and the transceiver 520 may be connected by using the bus system 540. The memory 530 may be configured to store an instruction. The processor 510 is configured to execute the instruction stored in the memory 530, so as to control the transceiver 520 to send information or a signal.

The processor 510 is configured to establish a connection to the host. The transceiver 520 is configured to receive a request message sent by the host, where the request message includes a target parameter of an NVM subsystem to which the host needs to connect. The processor 510 is configured to determine, by searching for parameter information of the at least one NVM subsystem, a target NVM subsystem that meets the target parameter and determine routing information of the target NVM subsystem. The transceiver 520 is configured to send a response message to the host, where the response message includes the routing information of the target NVM subsystem, so that the host establishes a connection to the target NVM subsystem based on the routing information of the target NVM subsystem.

Therefore, the server in the non-volatile memory system according to the embodiment of the invention receives the target parameter that is sent by the host and that is of the NVM subsystem to which the host needs to connect; and determines, by searching for the parameter information of the at least one NVM subsystem, that an NVM subsystem that meets the target parameter is the target NVM subsystem, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets a requirement, and connection reliability is improved.

It should be understood that in the embodiment of the invention, the processor 510 may be a central processing unit (CPU), or the processor 510 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 530 may include a read-only memory and a random access memory, and provide an instruction and data for the processor 510. A part of the memory 530 may further include a non-volatile random access memory. For example, the memory 530 may further store information about a device type.

In addition to a data bus, the bus system 540 may further include a power bus, a control bus, a status signal bus, and the like. However, for clarity of description, various buses are marked as the bus system 540 in the figure.

In an implementation process, operations of the foregoing method may be completed by using an integrated logic circuit of hardware in the processor 510 or by an instruction in a form of software. Operations of the methods disclosed with reference to the embodiments of the invention may be directly performed by using a hardware processor, or performed by using a combination of hardware and software modules in the processor. The software module may be located in a mature storage medium in the art, such as a random access memory, a flash memory, a read-only memory, a programmable read-only memory or an electrically erasable programmable memory, or a register. The storage medium is located in the memory 530. The processor 510 reads information from the memory 530, and completes the operations of the foregoing method in combination with hardware in the processor 510. To avoid repetition, details are not described herein.

Optionally, the processor 510 is specifically configured to: obtain current parameter information of each NVM subsystem before determining the target NVM subsystem that meets the target parameter; and update the stored parameter information of each NVM subsystem based on the current parameter information of each NVM subsystem.

Optionally, the parameter information of each NVM subsystem includes at least one of the following: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

It should be understood that the server 500 in the non-volatile memory system according to the embodiment of the invention may be corresponding to the server 300 according to the embodiments of the invention, and may be corresponding to the server in the method 200 according to the embodiments of the invention, and the foregoing and other operations and/or functions of modules in the server 500 are respectively used to implement corresponding procedures of the server in the method shown in FIG. 3. For brevity, details are not described herein.

Therefore, the server in the non-volatile memory system according to the embodiment of the invention receives the target parameter that is sent by the host and that is of the NVM subsystem to which the host needs to connect; and determines, by searching for the parameter information of the at least one NVM subsystem, that the NVM subsystem that meets the target parameter is the target NVM subsystem, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

Figure 7:
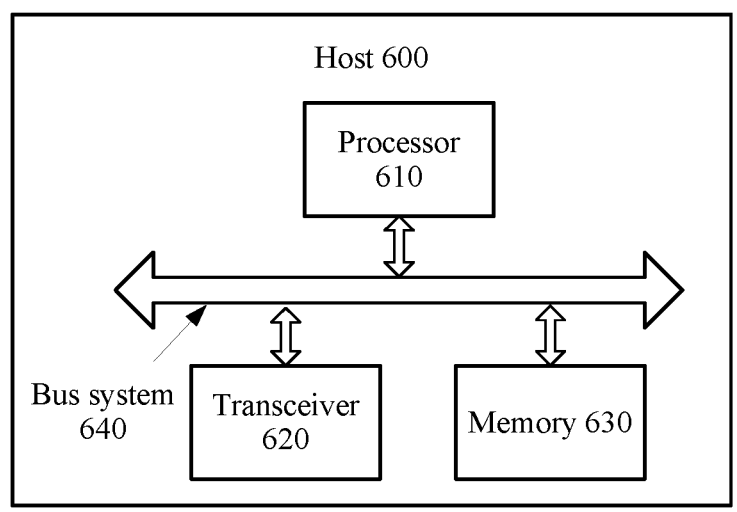
FIG. 7 is a schematic block diagram of a host in a non-volatile memory system according to another embodiment of the invention.

FIG. 7 shows a schematic block diagram of a host 600 in a non-volatile memory system according to an embodiment of the invention. The non-volatile memory system includes the host 600, a server, and at least one non-volatile memory NVM subsystem, the at least one NVM subsystem is configured to provide data storage for the host 600, and the server stores parameter information and routing information of each of the at least one NVM subsystem. As shown in FIG. 7, the host 600 includes a processor 610 and a transceiver 620. The processor 610 is connected to the transceiver 620. Optionally, the apparatus 600 further includes a memory 630. The memory 630 is connected to the processor 610. Further, optionally, the apparatus 600 includes a bus system 640. The processor 610, the memory 630, and the transceiver 620 may be connected by using the bus system 640. The memory 630 may be configured to store an instruction. The processor 610 is configured to execute the instruction stored in the memory 630, so as to control the transceiver 620 to send information or a signal.

The processor 610 is configured to establish a connection to the server. The transceiver 620 is configured to: send a request message to the server, and receive a response message sent by the server based on the request message, where the response message includes parameter information and routing information of some or all of the at least one NVM subsystem. The processor 610 is configured to: determine, based on the parameter information of some or all of the NVM subsystem, a target NVM subsystem that meets a target parameter and determine routing information of the target NVM subsystem, where the target parameter is a parameter of an NVM subsystem to which the host needs to connect; and establish a connection to the target NVM subsystem based on the routing information of the target NVM subsystem.

Therefore, the host in the non-volatile memory system according to the embodiment of the invention establishes the connection to the server, obtains the parameter information that is of some or all of the NVM subsystem and that is stored in the server, and selects, as the target NVM subsystem based on the parameter information of some or all of the NVM subsystem, an NVM subsystem that meets a requirement of the host, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

It should be understood that in the embodiment of the invention, the processor 610 may be a CPU, or the processor 610 may be another general purpose processor, a DSP, an ASIC, an FPGA or another programmable logic device, a discrete gate or transistor logic device, a discrete hardware component, or the like. The general purpose processor may be a microprocessor, or the processor may be any conventional processor or the like.

The memory 630 may include a read-only memory and a random access memory, and provide an instruction and data for the processor 610. A part of the memory 630 may further include a non-volatile random access memory. For example, the memory 630 may further store information about a device type.

In addition to a data bus, the bus system 640 may further include a power bus, a control bus, a status signal bus, and the like. However, for clarity of description, various buses are marked as the bus system 640 in the figure.

In an implementation process, operations of the foregoing method may be completed by using an integrated logic circuit of hardware in the processor 610 or by an instruction in a form of software. Operations of the methods disclosed with reference to the embodiments of the invention may be directly performed by using a hardware processor, or performed by using a combination of hardware and software modules in the processor. The software module may be located in a mature storage medium in the art, such as a random access memory, a flash memory, a read-only memory, a programmable read-only memory or an electrically erasable programmable memory, or a register. The storage medium is located in the memory 630. The processor 610 reads information from the memory 630, and completes the operations of the foregoing method in combination with hardware in the processor 610. To avoid repetition, details are not described herein.

Optionally, the parameter information of each NVM subsystem includes at least one of the following: a total capacity of each NVM subsystem, an available capacity of each NVM subsystem, information about at least one namespace in each NVM subsystem, information about at least one NVM controller in each NVM subsystem, and a mapping relationship between the at least one namespace and the at least one NVM controller.

It should be understood that the host 600 in the non-volatile memory system according to the embodiment of the invention may be corresponding to the host 400 according to the embodiments of the invention, and may be corresponding to the host in the method 100 according to the embodiments of the invention, and the foregoing and other operations and/or functions of modules in the host 600 are respectively used to implement corresponding procedures of the host in the method shown in FIG. 2. For brevity, details are not described herein.

Therefore, the host in the non-volatile memory system according to the embodiment of the invention establishes the connection to the server, obtains the parameter information that is of some or all of the NVM subsystem and that is stored in the server, and selects, as the target NVM subsystem based on the parameter information of some or all of the NVM subsystem, the NVM subsystem that meets the requirement of the host, so that the host establishes the connection to the target NVM subsystem. This can prevent the host from connecting to an incorrect or inappropriate NVM subsystem, and avoid repeated connection caused by blind selection and connection. In this way, the host can establish the connection to the NVM subsystem that meets the requirement, and connection reliability is improved.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the embodiments of the invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of the invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of the invention, but are not intended to limit the protection scope of the embodiments of the invention. Any variation or replacement readily figured out by a person skilled in the art within the technical scope disclosed in the invention shall fall within the protection scope of the embodiments of the invention. Therefore, the protection scope of the embodiments of the invention shall be subject to the protection scope of the claims.

What is claimed is:

1. A method for establishing a connection in a non-volatile memory system, wherein the non-volatile memory system comprises a host, a server, and at least one non-volatile memory express (NVMe) subsystem, wherein the at least one NVMe subsystem is configured to provide a data storage for the host, wherein the server stores parameter information and routing information of each of the at least one NVMe subsystem, wherein the method is performed by the server, the method comprising:

establishing a connection to the host;

receiving a request message sent by the host, wherein the request message comprises a target parameter indicating at least one of a target storage capacity or a target performance of a target NVMe subsystem to which the host needs to connect;

determining, by searching for parameter information comprising at least one of a current storage capacity or a current performance of the at least one NVMe subsystem, the target NVMe subsystem that meets the at least one of the target storage capacity or the target performance parameter and determining routing information of the target NVMe subsystem; and sending a response message to the host, wherein the response message comprises the routing information of the target NVMe subsystem, so that the host establishes a connection to the target NVMe subsystem based on the routing information of the target NVMe subsystem.

2. The method according to claim 1, wherein before the determining the target NVMe subsystem that meets the target parameter, the method further comprises:

obtaining current parameter information of the at least one NVMe subsystem; and updating the stored parameter information of the at least one NVMe subsystem based on the current parameter information of each NVMe subsystem.

3. The method according to claim 1, wherein the parameter information of the at least one NVMe subsystem comprises at least one of a total capacity of the at least one NVMe subsystem, an available capacity of the at least one NVMe subsystem, information about at least one namespace in the at least one NVMe subsystem, information about at least one NVMe controller in the at least one NVMe subsystem, or a mapping relationship between the at least one namespace and the at least one NVMe controller.

4. A method for establishing a connection in a non-volatile memory system, wherein the non-volatile memory system comprises a host, a server, and at least one non-volatile memory express (NVMe) subsystem, wherein the at least one NVMe subsystem is configured to provide a data storage for the host, wherein the server stores parameter information and routing information of each of the at least one NVMe subsystem, the method is performed by the host, the method comprising:

establishing a connection to the server;

sending a request message to the server, the request message requesting a parameter indicating at least one of a current storage capacity or a current performance of a target NVMe subsystem;

receiving a response message sent by the server based on the request message, wherein the response message comprises the at least one of the current storage capacity or the current performance parameter and routing information of the at least one NVMe subsystem;

determining, based on the at least one of the current storage capacity or the current performance parameter of the at least one NVMe subsystem, a target NVMe subsystem that meets the at least one of a target storage capacity or a target performance parameter and determining routing information of the target NVMe subsystem, wherein the at least one of the target storage capacity or a target performance parameter is needed for the host; and establishing a connection to the target NVMe subsystem based on the routing information of the target NVMe subsystem.

5. The method according to claim 4, wherein the parameter information of the at least one NVMe subsystem comprises at least one of a total capacity of the at least one NVMe subsystem, an available capacity of the at least one NVMe subsystem, information about at least one namespace in the at least one NVMe subsystem, information about at least one NVMe controller in the at least one NVMe subsystem, or a mapping relationship between the at least one namespace and the at least one NVMe controller.

6. A server in a non-volatile memory system, wherein the non-volatile memory system comprises a host and at least one non-volatile memory express (NVMe) subsystem, wherein the at least one NVMe subsystem is configured to provide a data storage for the host, the server comprising:

a processor; and a non-transitory computer-readable storage medium coupled to the processor and storing programming instructions for execution by the processor, parameter information, and routing information of the at least one NVMe subsystem, wherein the programming instructions instruct the processor to:

establish a connection to the host;

receive a request message sent by the host, wherein the request message comprises a target parameter indicating at least one of a target storage capacity or a target performance of a target NVMe subsystem to which the host needs to connect;

determine, by searching for parameter information comprising at least one of a current storage capacity or a current performance of the at least one NVMe subsystem, the target NVMe subsystem that meets the at least one of the target storage capacity or the target performance parameter and determine routing information of the target NVMe subsystem; and send a response message to the host, wherein the response message comprises the routing information of the target NVMe subsystem, so that the host establishes a connection to the target NVMe subsystem based on the routing information of the target NVMe subsystem.

7. The server according to claim 6, wherein when determining the target NVMe subsystem the processor is further configured to:

obtain current parameter information of the at least one NVMe subsystem before determining the target NVMe subsystem that meets the target parameter; and update the stored parameter information of the at least one NVMe subsystem based on the current parameter information of each NVMe subsystem.

8. The server according to claim 6, wherein the parameter information of the at least one NVMe subsystem comprises at least one of a total capacity of the at least one NVMe subsystem, an available capacity of the at least one NVMe subsystem, information about at least one namespace in the at least one NVMe subsystem, information about at least one NVMe controller in the at least one NVMe subsystem, or a mapping relationship between the at least one namespace and the at least one NVMe controller.

9. A host in a non-volatile memory system, wherein the non-volatile memory system further comprises a server and at least one non-volatile memory express (NVMe) subsystem, wherein the at least one NVMe subsystem is configured to provide a data storage for the host, wherein the server stores parameter information and routing information of the at least one NVMe subsystem, and the host comprising:

a processor, and a non-transitory computer-readable storage medium coupled to the processor and storing programming instructions for execution by the processor, wherein the programming instructions instruct the processor to:

establish a connection to the server;

send a request message to the server, the request message requesting a parameter information indicating at least one of a current storage capacity or a current performance of a target NVMe subsystem;

receive a response message sent by the server based on the request message, wherein the response message comprises the parameter information and routing information of the at least one NVMe subsystem;

determine, based on the at least one of the current storage capacity or the current performance parameter of the NVMe subsystem, a target NVMe subsystem that meets the at least one of a target storage capacity or a target performance parameter and determine routing information of the target NVMe subsystem, wherein the at least one of the target storage capacity or a target performance parameter is needed for the host, and establish a connection to the target NVMe subsystem based on the routing information of the target NVMe subsystem.

10. The host according to claim 9, wherein the parameter information of the at least one NVMe subsystem comprises at least one of a total capacity of the at least one NVMe subsystem, an available capacity of the at least one NVMe subsystem, information about at least one namespace in the at least one NVMe subsystem, information about at least one NVMe controller in the at least one NVMe subsystem, or a mapping relationship between the at least one namespace and the at least one NVMe controller.

* * * * *